US006827269B2

(12) United States Patent
Runge

(10) Patent No.: US 6,827,269 B2
(45) Date of Patent: Dec. 7, 2004

(54) SCANNER

(75) Inventor: Wolfram Runge, Freiburg (DE)

(73) Assignee: Sick AG (DE)

( * ) Notice: Subject to any disclaimer, the term of this patent is extended or adjusted under 35 U.S.C. 154(b) by 0 days.

(21) Appl. No.: 09/793,308

(22) Filed: Feb. 26, 2001

(65) Prior Publication Data

US 2001/0017319 A1 Aug. 30, 2001

(30) Foreign Application Priority Data

Feb. 29, 2000 (DE) .......................................... 100 09 493

(51) Int. Cl.$^7$ ................................................ G02B 5/00
(52) U.S. Cl. ........................... 235/462.32; 235/462.01; 235/462.07; 235/462.23; 235/462.22; 235/462.42
(58) Field of Search ..................... 235/462.01, 462.23, 235/462.32, 462.22, 462.27, 462.39, 462.42, 462.21, 462.07, 440, 454

(56) References Cited

U.S. PATENT DOCUMENTS

| | | | | |
|---|---|---|---|---|
| 4,808,804 A | * | 2/1989 | Krichever et al. ..... | 235/462.22 |
| 5,010,241 A | * | 4/1991 | Butterworth ................ | 235/454 |
| 5,340,982 A | * | 8/1994 | Nakazawa .................. | 250/235 |
| 5,406,060 A | * | 4/1995 | Gitin ...................... | 235/462.42 |
| 5,422,744 A | * | 6/1995 | Katz et al. ................. | 235/440 |
| 5,532,467 A | | 7/1996 | Roustaei | |
| 5,640,001 A | * | 6/1997 | Danielson et al. ..... | 235/462.23 |
| 5,754,670 A | | 5/1998 | Shin et al. | |
| 5,756,981 A | * | 5/1998 | Roustaei et al. ........ | 235/462.07 |
| 5,777,311 A | * | 7/1998 | Keinath et al. ......... | 235/462.27 |
| 5,834,753 A | | 11/1998 | Danielson et al. | |
| 5,859,417 A | * | 1/1999 | Dvorkis et al. ......... | 235/462.39 |
| 5,914,477 A | * | 6/1999 | Wang ...................... | 235/462.1 |
| 6,019,286 A | | 2/2000 | Li et al. | |
| 6,049,406 A | * | 4/2000 | Zocca ......................... | 359/196 |
| 6,177,979 B1 | * | 1/2001 | Oliva .......................... | 355/53 |
| 6,347,163 B2 | * | 2/2002 | Roustaei ................ | 235/462.21 |

FOREIGN PATENT DOCUMENTS

| | | |
|---|---|---|
| DE | 3936126 A1 | 5/1990 |
| EP | 0864994 A2 | 9/1998 |
| EP | 0959425 A2 | 11/1999 |
| EP | 0962880 A1 | 12/1999 |
| EP | 0962880 A1 | 12/1999 |

* cited by examiner

Primary Examiner—Steven S. Paik
(74) Attorney, Agent, or Firm—Townsend and Townsend and Crew LLP

(57) ABSTRACT

A scanner for the detection of one-dimensional and/or two-dimensional codes has a light receiver arranged in a housing and an optical receiving system associated therewith and also accommodated in the housing. At least one light source is additionally provided in the housing to illuminate the region to be scanned arranged in a scanning plane. At least one of the light source and the optical receiving system is movable in order to allow a reading distance between the housing and the object plane to be varied.

16 Claims, 1 Drawing Sheet

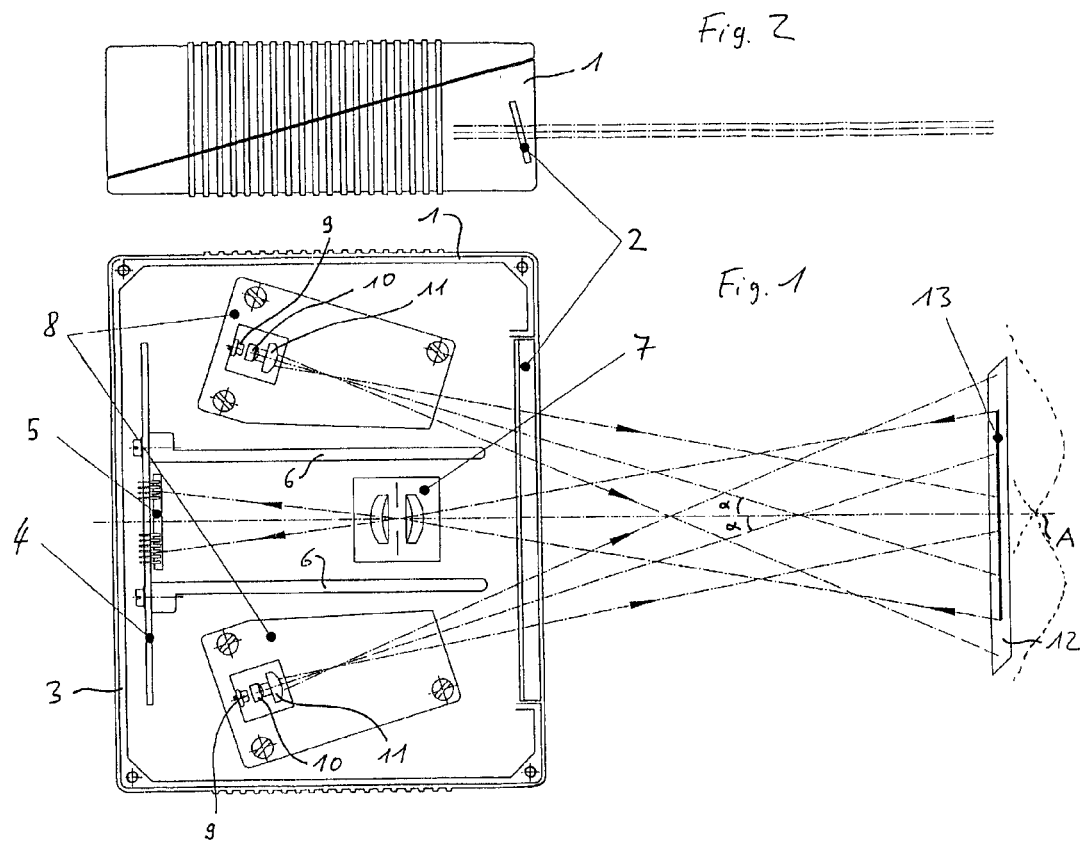

SCANNER

BACKGROUND OF THE INVENTION

The invention relates to a scanner, in particular for the detection of one-dimensional and/or two-dimensional codes, having a light receiver arranged in a housing and an optical receiving system associated therewith and also accommodated in the housing.

Such scanners known from the state of the art, can be formed, for example as line scanners in order to be able to read barcodes in this way without a relative movement having to be made between the scanner and the code. Such scanners can, however, also be utilized for the reading of two-dimensional codes provided that a relative movement is generated between the scanner and the code by means, for example, of a conveying motion. Alternatively, it is moreover also possible to use area scanners known from the state of the art instead of a line scanner, with said area scanners being able to read two-dimensional codes without a relative movement between the scanner and the code.

Known scanners based on the functional principle described above have the disadvantage that codes are frequently only recognized incompletely or incorrectly or, in extreme cases, not at all as a result of inadequate or changing light conditions.

SUMMARY OF THE INVENTION

An object of the present invention comprises the further development of a scanner of the initially named kind such that reading errors caused by inadequate or changing light conditions can be at least largely excluded and in particular fully excluded.

This object is satisfied in accordance with the invention by at least one light source being additionally provided in the housing to illuminate the region to be scanned arranged in an object plane.

Since the scanner has its own light source in accordance with the invention which provides an optimum illumination of the region to be scanned or of the code to be read, the influence of the ambient light conditions is at least largely eliminated, which means that the codes can also be read reliably and correctly in a dark environment or in an environment with changing light conditions.

It is preferred for the light source to be designed to transmit a constant light intensity so that a continuous illumination is ensured which is constant during the reading procedure.

It is furthermore of advantage if the light source is formed by at least one laser diode since such a point light source allows a good beam formation.

It is preferred for an optical transmitting system to be associated with the light source, with said transmitting optical system transforming a substantially homocentric light bundle transmitted by the light source into a substantially linear light beam focussed on the object plane. When the scanner in accordance with the invention is used as a linear scanner, this measure ensures that at least a large part of the light energy transmitted from the light source is concentrated on the respective line to be read by the scanner, so that the line to be scanned is ideally illuminated. The optical transmitting system preferably consists of refractive, diffractive and/or holographic elements.

The intensity of the linear light beam can have a Gaussian distribution along the illuminated line. In this case, when a plurality of light sources are provided, skillful overlapping of the lines which are aligned to one another can be used to ensure that a relatively large line region is constantly illuminated.

To allow different distances to be set between the scanner and the object plane, i.e. different reading distances and/or different code sizes, the light source and/or the optical receiving system can be movably held in the housing and be adjustable to different positions, with it being particularly advantageous for the movements of the light source and the optical receiving system to be mechanically correlated with one another so that the user must, for example, only actuate one adjusting screw in order to move the light source and optical receiving system simultaneously and in a manner matched to each another such that, on the one hand, the optical receiving system is focused on the scanning plane and, on the other hand, an optimum illumination of the region to be scanned in the scanning plane is ensured.

In order to realize the said adjustment possibilities, the reception optics can be displaceable along its optical axis. Furthermore, the light source can be pivotably formed in a first plane which extends at least substantially parallel to the optical axes of the transmission and optical receiving system. It is possible due to these two adjustment possibilities to adapt the scanner in accordance with the invention to different reading distances and different code sizes.

It is moreover, also possible to mature the light source pivotable in a second plane substantially perpendicular to the said first plane, with this second plane including the optical axis of the optical transmitting system. This adjustment makes it possible to achieve a situation in which, for example, when a linear light beam is transmitted, this light beam can be adjusted, in the scanning plane, perpendicular to the line of light generated in the scanning plane, and can in particular be aligned with a further line of light.

It is particularly preferred if two units positioned with their optical axes at an angle to one another and consisting of one light source each and one optical transmitting system each are provided in the housing of the scanner in accordance with the invention. An even better illumination of the region to be scanned can be achieved by the provision of two or more light sources.

An embodiment of the invention having two light sources, which each generate a linear light beam, is explained in more detail below with reference to the description of the figures.

The light receiver can be formed as a spatial resolution detector, in particular as a CCD array, CCD area, CMOS array or CMOS area.

BRIEF DESCRIPTION OF THE DRAWINGS

The invention is explained below by way of an embodiment with reference to the figures, in which:

FIG. 1 is a plan view of a scanner in accordance with the invention with the housing cover removed in which the essential components for the invention are shown schematically; and FIG. 2 is a side view of the scanner in accordance with FIG. 1 with the housing cover in place.

DESCRIPTION OF THE PREFERRED EMBODIMENTS

The scanner of FIG. 1 in accordance with the invention has a substantially rectangular housing 1 which has a mount for a window 2 at one of its longer narrow sides. This window 2 is positioned obliquely to avoid interfering reflections. This oblique position can be seen in particular from FIG. 2.

A circuit board 4, on which a light receiver or sensor 5 is arranged, is mounted in parallel alignment to the narrow side 3 in the region of the narrow side 3 of the housing 1 opposite the window 2. The circuit board 4 is screwed to two webs 6 extending perpendicular to it. The webs 6 are in turn, for example, components of the housing 1. The webs 6 can be made together with the housing in a single injection molding procedure. The webs 6 extend over a large part of the housing width and also over a large part of the housing thickness extending perpendicular to the drawing plane in accordance with FIG. 1 in order to thus create an optical separation between the light receiver 5 and the light transmitters which are described in the following. This optical separation can naturally also be optimized by the webs 6 at the inside of the housing 1 extending over the whole housing thickness.

A receiving lens 7 is arranged between the two webs 6 and between the light receiver 5 and the window 2, and said receiving lens 7 is movably held along its optical axis A and is adjustably held at different positions in the housing 1. A band-pass filter (not shown) can optionally be interposed before or after the lens 7 in order to filter the frequencies of interest from the light received.

A carrier member 8 is provided at both sides of the optical axis A outside the region bounded by the two webs 6, and a laser diode 9, a collimator lens 10 and a cylinder lens 11 are each arranged thereon. The cylinder lens 11 has in each case the function of transforming the light transmitted from the laser diode 9 and passed through the collimator lens 10 from a point-focused light beam into a linearly focused light beam. The linear light beams or light lines transmitted from the two units 9, 10, 11 are aligned with one another and focused to overlap one another at a scanning plane 12 inside which a code 13 to be read is located. The lens 7 is also focused on this scanning plane 12.

The intensity of each light line has a Gaussian distribution along each illuminated line in each of the two light beams, as is drawn in with a broken line in FIG. 1. The overlapping of the two light lines is selected such that a substantially energetically constant illumination results over the whole length of the commonly generated illuminated line of light due to the addition of the two Gaussian energy distributions.

The two carrier members 8 are supported in housing 1 such that they are pivotable in a plane extending parallel to the plane of drawing in FIG. 1 and thus also parallel to the optical axes of the optical transmitting systems 10, 11 and the receiving lens 7. The angle α between the optical axis of the receiving lens 7 and the optical axes of the optical transmitting systems 10, 11 can be adjusted by this pivotal movement such that ultimately different distances can be set between the housing 1 and the object plane 12.

The carrier members 8 can moreover be pivotable in a plane extending perpendicular to the plane of drawing, said plane including in each case the optical axis of the optical transmitting system 10, 11 in order to align the two generated light lines with one another. It can also be ensured by this adjustment possibility that the illuminated line in the scanning plane 12 is congruent with that line which is imaged on the light receiver 5 by the lens 7. An additional possibility to align the two generated light lines can be obtained by the carrier members 8 each also being rotatably supported around the optical axes of their respective optical transmitting systems 10, 11.

A scanner is thus provided by the arrangement in accordance with FIGS. 1 and 2 which actively illuminates a code to be read with a line of light energetically largely constant over its length so that a problem-free reading of the code via the receiving lens 7 becomes possible.

What is claimed is:

1. A scanner for detecting one-dimensional or two-dimensional codes in a region of an object plane, the scanner comprising:
   a housing;
   a light sensor disposed within the housing;
   an optical receiver module disposed within the housing so as to direct light from the region of the object plane toward the light sensor, wherein the optical receiver module is movably held within the housing, thereby allowing a focused image of the region of the object plane to be provided at the light sensor when a reading distance between the housing and the object plane is varied; and
   a first light source module disposed within the housing so as to illuminate the region of the object plane to be scanned, wherein the first light source module is movably held within the housing, thereby allowing a substantially optimal illumination of the region of the object plane to be provided as the reading distance is varied.

2. The scanner according to claim 1 wherein movements of the first light source module and the optical receiver module within the housing are mechanically correlated.

3. The scanner according to claim 1 wherein the optical receiver module is movable along an optical axis of the optical receiver module.

4. The scanner according to claim 1 wherein the first light source module is adapted to transmit light having a substantially constant intensity.

5. The scanner according to claim 1 wherein the first light source module comprises at least one laser diode.

6. The scanner according to claim 1, wherein the first light source module includes:
   a first light source generating a substantially homocentric light bundle; and
   a first optical transmitter system fixedly coupled to the first light source and adapted to transform the substantially homocentric light bundle into a substantially linear light beam focused on the object plane.

7. The scanner according to claim 6 wherein the first light source module is pivotable in a plane substantially parallel to an optical plane that includes respective optical axes of the optical receiver module and the first optical transmitter system.

8. The scanner according to claim 6 wherein the first light source module is pivotable in a plane that includes an optical axis of the first optical transmitter system and is substantially perpendicular to an optical plane that includes respective optical axes of the optical receiver module and the first optical transmitter system.

9. The scanner according to claim 6, further comprising a second light source module movably held within the housing, the second light source module including:
   a second light source; and
   a second optical transmitter system fixedly coupled to the second light source and adapted to transform light from the second light source into a substantially linear light beam focused on the object plane,
   wherein respective optical axes of the first and second optical transmitter systems are positioned at an angle to one another.

10. The scanner according to claim 9 wherein the first and second light source modules are movable with respect to each other and with respect to the optical receiver module.

11. The scanner according to claim 10 wherein the first and second light source modules are movable so as to illuminate respective line regions in the object plane that are adjacent to one another.

12. The scanner according to claim 10 wherein the first and second light source modules are movable so as to illuminate respective line regions in the object plane that overlap one another.

13. The scanner according to claim 6 wherein the intensity of the substantially linear light beam along an illumination line is substantially constant.

14. The scanner according to claim 6, wherein the first optical transmitter system includes at least one of a refractive element, a diffractive element, and a holographic element.

15. The scanner according to claim 1 wherein the light sensor includes one of a CCD array, a CCD area, a CMOS array, and a CMOS area.

16. A scanner for detecting one-dimensional or two-dimensional codes in a region of an object plane, the scanner comprising:

a housing;

a light sensor disposed within the housing;

an optical receiver module disposed within the housing so as to direct light toward the light sensor, wherein the optical receiver module is movably held within the housing so as to allow a reading distance between the housing and the object plane to be varied; and a first light source module disposed within the housing so as to illuminate the region of the object plane to be scanned, wherein the first light source is movably held within the housing, wherein the first light source module includes:

a first light source generating a substantially homocentric light bundle; and a first optical transmitter system fixedly coupled to the first light source and adapted to transform the substantially homocentric light bundle into a substantially linear light beam focused on the object plane, the first optical transmitter system having no moving parts.

* * * * *